United States Patent [19]
Marach

[11] Patent Number: 5,221,218
[45] Date of Patent: Jun. 22, 1993

[54] EDGE-CARD CONNECTOR

[75] Inventor: David R. Marach, Marengo, Ill.

[73] Assignee: Cooper Industries, Inc., Houston, Tex.

[21] Appl. No.: 916,024

[22] Filed: Jul. 17, 1992

[51] Int. Cl.⁵ .............................................. H01R 13/00
[52] U.S. Cl. ...................................................... 439/637
[58] Field of Search .................................. 439/629–637

[56] References Cited

U.S. PATENT DOCUMENTS 4,904,197  2/1990  Cabourne ............................ 439/637
4,993,972  2/1991  Lin ...................................... 439/637

Primary Examiner—Joseph H. McGlynn
Attorney, Agent, or Firm—Laff, Whitesel, Conte & Saret

[57] ABSTRACT

A card-edge connector for connecting wiring to electronic circuit cards comprises a generally rectangular housing, one or more removable wire termination blocks, and a cover for retaining the wire termination blocks and for protecting the interior of the connector. A slit-like aperture for receiving a peripheral edge of one or more electronic circuit cards to which wire connections are desired is provided in a first external surface of the housing. The circuit card receptacle has a plurality of contact members for mechanically and electrically engaging contact pads located on the exterior surface of the circuit cards. The inventive connector also has one or more receptacles for receiving the removable wire termination blocks. These receptacles are preferably provided on a different side of the connector housing. Each of the removable wire termination blocks has a plurality of wire retaining terminals to which the external wiring is attached. These terminals are connected to contacts on the termination block which, in turn, mate with contacts in the connector's termination block receptacles. In use, wiring is installed on the termination blocks while the blocks are separated from the connector. The termination blocks are subsequently installed on the connector. The cover is then installed over the termination blocks to retain them in position, and to hold attached wiring in a desired configuration.

25 Claims, 9 Drawing Sheets

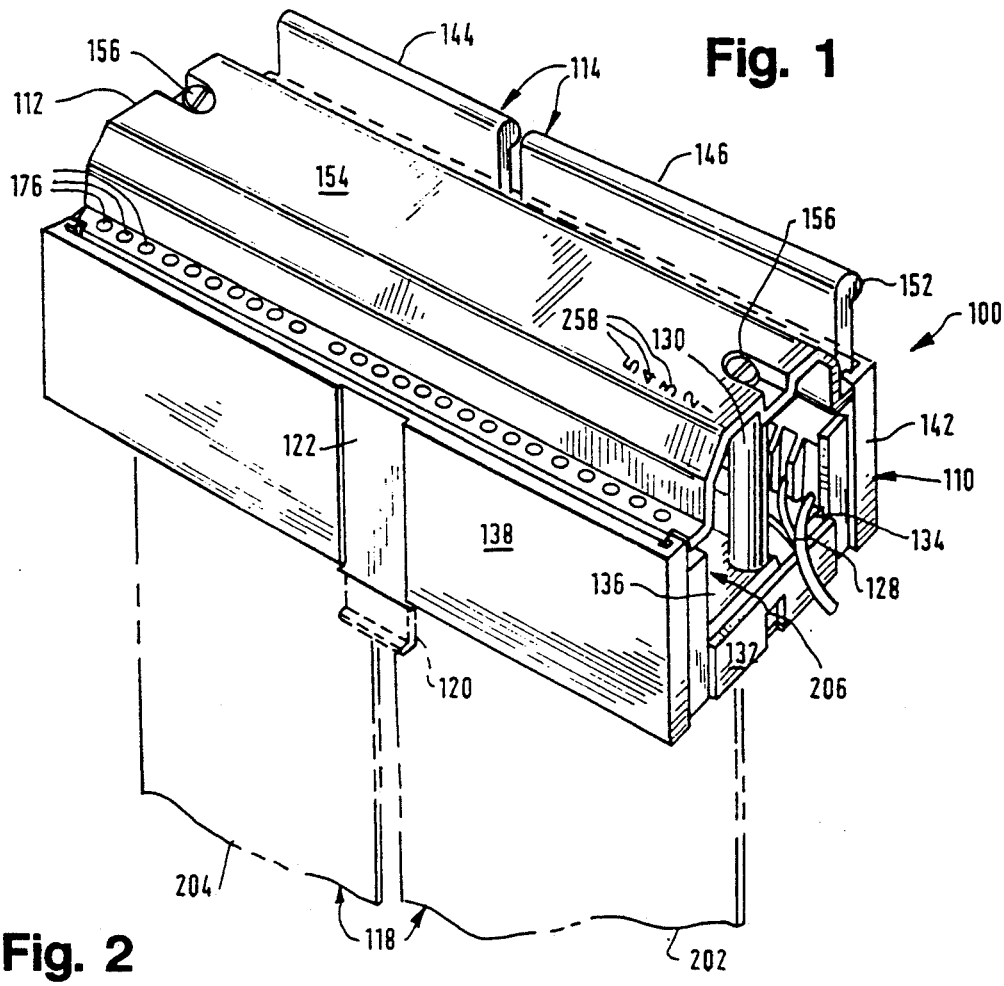
Fig. 1
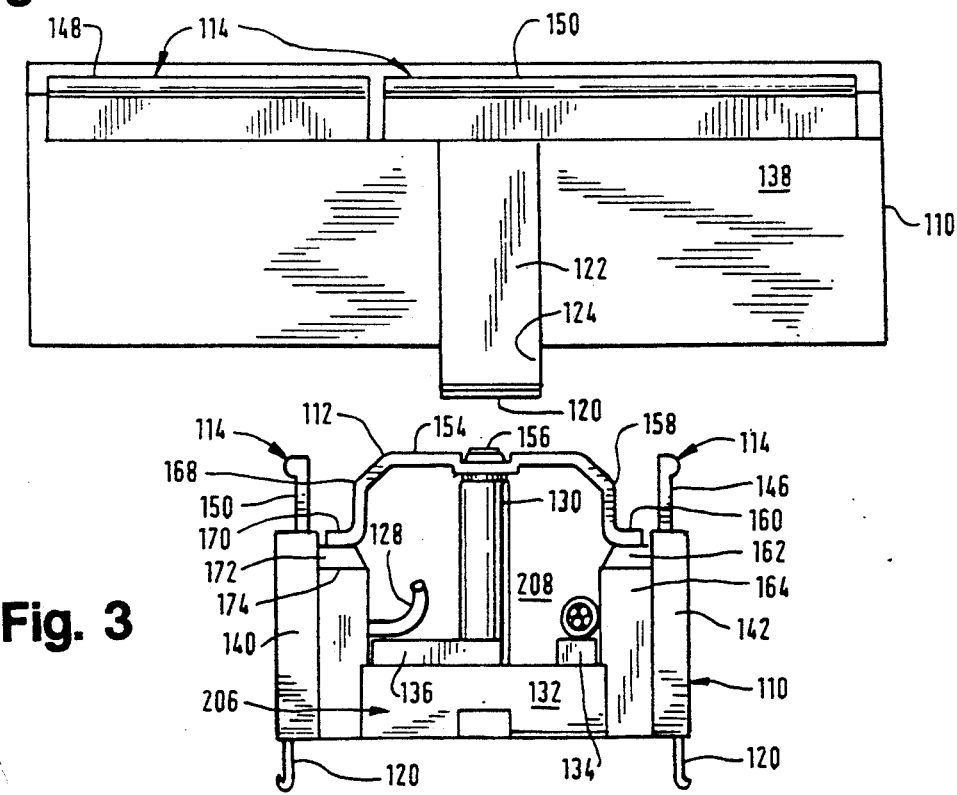
Fig. 2
Fig. 3

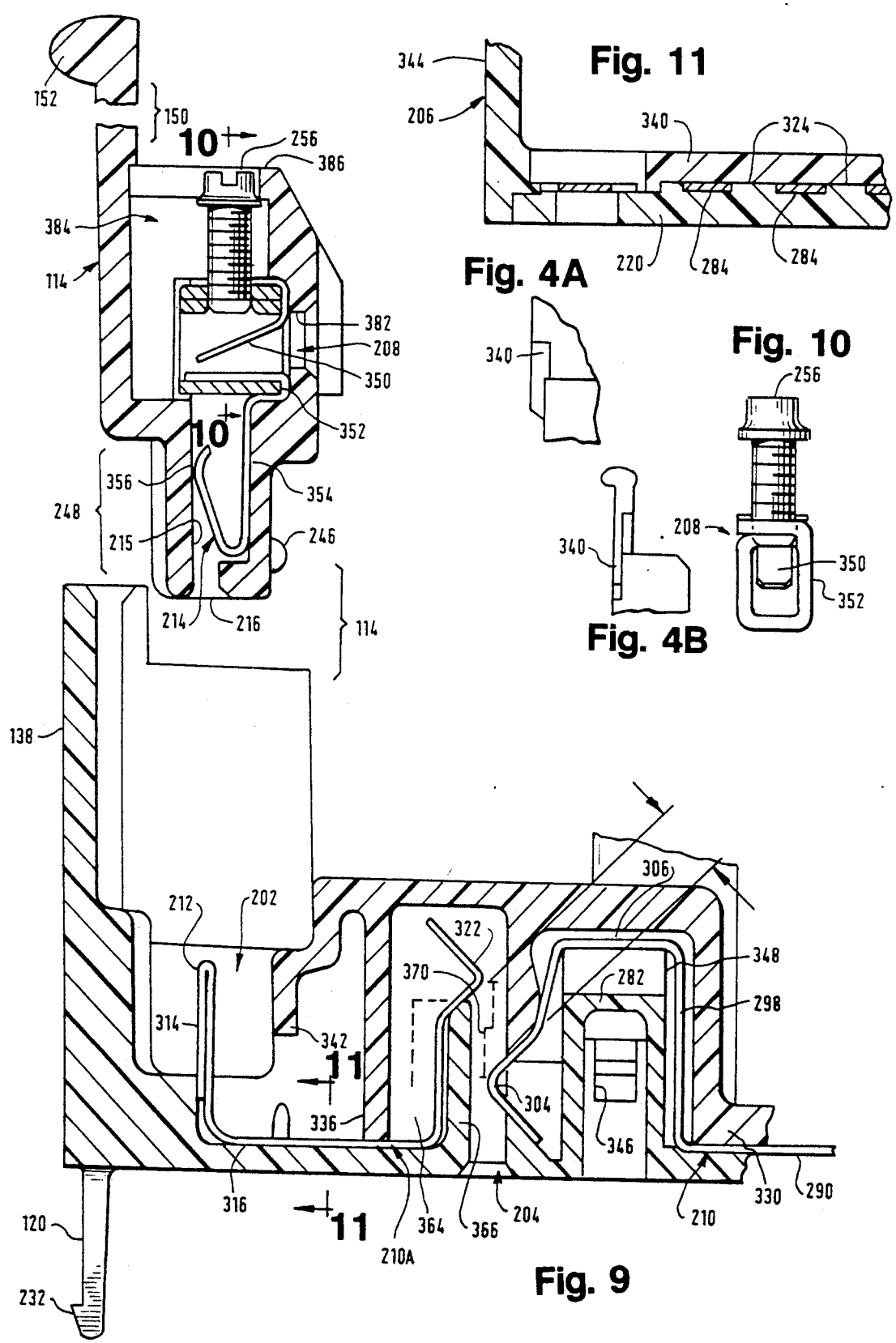

EDGE-CARD CONNECTOR

BACKGROUND OF THE INVENTION

This invention relates to electrical connector apparatus and methods, and more particularly to apparatus and methods for removably connecting electrical wiring to an electronic circuit card or other substrate having a plurality of connection pads located adjacent a peripheral edge thereof.

A common problem in the telecommunications, computer, and electrical control environments, and in many other environments in which electronic technology is applied, is providing suitable electrical and mechanical interconnections between electronic circuit boards, cards or other substrates, and off-card electrical wiring. Printed circuit cards of various types have become the preferred substrate for mounting and interconnecting electronic components, in order to form electronic circuits, subsystems, or complete systems.

Such printed circuit boards are commonly constructed having one or more substantially planer, laminated layers of dielectric material, such as a glass-fiber filled epoxy resin, upon which is applied one or more layers of a conductive material such as copper. The conductive material is typically photographically etched to produce a pattern of individual conductors suitable for interconnecting electronic components which are mounted upon or through the dielectric layers.

While this circuit card construction is predominant in the present-day electronics industry, a variety of other circuit wiring substrates have been developed, and others are expected to be produced in the future. Accordingly, although we typically refer to "printed" circuit cards or boards, it will be understood that the invention disclosed herein will be equally applicable to any relatively thin, substantially planar substrate for supporting and interconnecting electronic components.

In most cases, it is necessary to connect each printed circuit card to other circuit cards, to power supplies, and to a variety of external devices. For example, in telephone switching systems, circuit cards in the switching equipment must be connected to subscriber telephone instruments, batteries, and transmission facilities. In industrial control systems, circuit cards must be connected to measurement and sensing devices, contactors, motors, operator controls and indicators and the like. In virtually every electronic system, some type of electrical wiring is used to connect the circuit card to the external device, and a mechanical and electrical interface between the wiring and the circuit card is required. In modern systems, a standard logic controller is used with many interchangeable external components, and it is highly desireable that all of these components and their associated wiring be quickly changeable.

In the past, it was common to solder wiring directly to circuit boards. However, this practice made it inconvenient to disconnect the circuit board for testing, maintenance, or repair. In addition, the repeated application of heat and stress involved in desoldering and resoldering wires to the circuit board promotes delamination and other damage to the board card. As an alternative, wiring terminal blocks have been developed for permanent installation on circuit cards. The terminal blocks include screw terminals or other means to which external wiring may be removably connected. However, these terminal blocks typically require each wire to be separately connected and disconnected, increasing the cost and time involved in testing or replacing a defective card. In addition, the mechanical process of securing wiring to the terminal blocks can subject the circuit card to stresses that cause damage.

Accordingly, there have been developed a variety of connector structures to provide mechanical and electrical interfaces by which circuit cards may be removably interconnected with external wiring. In one configuration which has achieved high commercial acceptance, a special "card-edge" connector is provided which has a slit-like aperture for receiving a peripheral edge of the circuit card. A plurality of contact pads, typically constructed of the same conductive material as that used for internal interconnections on the circuit card, are provided in a predefined pattern on the exterior surface of the card adjacent the peripheral edge. A plurality of resilient contacts are provided in a corresponding pattern in the connector for electrically mating with the pads on the circuit card.

For each signal lead on the circuit card to which an external connection is desired, a connection is made to one or more of the edge contact pads. When the circuit card is installed in the connector, each of the signals brought to the edge of the card become available at the corresponding contact of the connector. Circuit cards may be easily removed and replaced, severing or making a large plurality of external connections essentially en masse.

Although the prior-art circuit card edge connectors avoid some of the previously mentioned problems associated with the direct attachment of wiring to a circuit card, they create new problems because means must be provided to attach such wiring to the connector. In one prior art approach, the edge connector is itself soldered to an auxiliary circuit card, and wiring may be directly attached to the auxiliary card. The wiring may be soldered to the auxiliary circuit card, or terminal blocks or other connection means may be provided. This is an inadequate solution, because the direct attachment of wiring to the auxiliary card presents at least the same problems as have been discussed heretofore with respect to the primary circuit card.

In addition, a large number of connections to a circuit card is typically required, and in many applications, these connections must carry significant amounts of current. As a result, it may be required to connect a substantial bundle of heavy-guage wires to the auxiliary card. These wires can apply significant force to the the circuit cards and to the connector. Since the connections between the wires and the auxiliary circuit card are relatively fragile, these stresses make the connections unreliable, and can easily cause permanent damage the auxiliary circuit card and the connector.

In another prior art approach wire connection terminals are provided on the edge connector itself, eliminating the need for an auxiliary circuit card. This arrangement is also unacceptable in many applications. The need to minimize the cost of packaging and housing modern electronic equipment often requires that the equipment be constructed with very little separation between adjacent circuit cards. Accordingly, the density of connectors and wiring required may be very high. In such high-density applications, it becomes progressively more difficult to install wiring on the prior art card edge connectors having terminal blocks because space, and the direction from which the terminals may be accessed, is limited. As each increment of wiring is installed, it tends to block access to the adjacent positions at which the craftsperson is about to install another wire. In addition, as previously noted, the high density of heavy-guage wiring can apply significant stresses to the terminals, the connector, and the circuit card. Prior-art card-edge connectors have failed to properly manage the positions of the wires or the stress they apply to the the terminals and other connector components.

Another problem with prior-art card-edge connectors which are equipped with terminal blocks is that each wire to be attached to the connector must be individually installed and secured by the craftsperson. Because each wire is individually serviced, it is not possible to rapidly connect and disconnect all wiring from the connector for testing or maintenance purposes. Often, the external component to which the wiring may be permanently attached requires maintenance, repair, or replacement. In such instances, it is essential that the component and its wiring be quickly disconnected, and another component immediately connected in its place. The need to install and secure each wire individually makes it impossible to rapidly disconnect one set of wires from the connector and immediately reconnect another set, such as may be desired when retrofitting or changing equipment in applications where only an extremely short period of equipment or circuit unavailability is permissible.

A further disadvantage of these prior-art card-edge connectors is that they generally require a substantial amount of time consuming manual wire preparation after the equipment containing the connectors has been installed. When the equipment is to be connected to external circuits, the external wiring cannot be installed onto the connectors until the equipment itself has been delivered and installed. Thus, once the equipment is delivered, the step of installing the wiring onto the connectors becomes one of the critical paths required to make the equipment operational. When a large number of circuits are involved, the wire installation step requires a substantial amount of time. Due to physical constraints, such as limited space in and near the equipment, it is difficult to shorten this time by applying more craftspersons to the task. Thus, the use of these conventional card-edge connectors lengthens the minimum time required to make equipment operational once it has been installed. Not only is this economically undesirable, it also reduces the ability of manufacturers and equipment operators to respond to emergency or disaster situations by pressing inventoried equipment into service rapidly.

OBJECTS AND SUMMARY OF THE INVENTION

It is therefore an object of the present invention to provide an apparatus for removably connecting wiring to electronic circuit boards which is adapted for use in high-density wiring applications.

It is another object of the invention to provide an apparatus for removably connecting wiring to electronic circuit boards which does not require an auxiliary circuit board for attaching the wiring to the connector.

It is a further object of the invention to provide an apparatus for removably connecting wiring to electronic circuit boards which permits the wiring to be rapidly installed on and removed from the connector apparatus.

It is another object of the invention to provide an apparatus for removably connecting wiring to electronic circuit boards which is adapted to minimize the time required to place into operation the equipment in which it is used.

It is a further object of the invention to provide an apparatus for removably connecting wiring to electronic circuit boards which is adapted to permit one set of wiring connector to be rapidly substituted for another set already installed thereon.

It is another object of the invention to provide an apparatus for removably connecting a substantial number of heavy-guage wires to electronic circuit boards which is adapted to effectively control the positions and routing of the attached wiring and to minimize the strain placed upon the connector by the wiring.

A card-edge connector for connecting wiring to electronic circuit cards constructed according to the present invention comprises a generally rectangular housing, one or more removable wire termination blocks, and a cover for retaining the wire termination blocks and for protecting the interior of the connector. A slit-like aperture for receiving a peripheral edge of one or more electronic circuit cards to which wire connections are desired is provided in a first external surface of the housing. The circuit card receptacle has a plurality of contact members for mechanically and electrically engaging contact pads located on the exterior surface of the circuit cards. The inventive connector also has one or more receptacles for receiving the removable wire termination blocks. These receptacles are preferably provided on a different side of the connector housing.

Each of the removable wire termination blocks has a plurality of wire retaining terminals to which the external wiring is attached. These terminals are connected to contacts on the termination block which, in turn, mate with contacts in the connector's termination block receptacles.

In use, the removable wire termination blocks are preferably removed from the connector prior to installation of the wiring. Alternatively, the termination blocks may be supplied separately from the connectors. The wiring is then installed on the termination blocks, and the termination blocks are subsequently installed on the connector. The cover is then installed over the termination blocks and the wiring. The cover serves to retain the the termination blocks in position. In addition, the cover and housing cooperate to secure the attached wiring in a desired position and routing, and minimize the strain the wiring places on the connector and its components.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 1 is a top perspective view of the card-edge connector assembly constructed according to the present invention, showing the device mounted on a wiring panel exemplary of an environment in which the invention may be employed;

FIG. 2 is a front elevation view of the card-edge connector assembly of FIG. 1;

FIG. 3 is a right-hand-side elevation view of the card-edge connector assembly of FIG. 1;

FIG. 4A is a partial front plan view of the connection taken along the circular dotted line in FIG. 4;

FIG. 4B is a side plan view of FIG. 4A;

FIG. 9 is an enlarged cross-section view of the card-edge connector assembly as in FIG. 8, showing the electrical contact structures in greater detail;

FIG. 10 is a front elevation view of a wire-retaining contact for use with the card-edge assembly of FIG. 1, taken along the view lines 10—10 of FIG. 9;

FIG. 11 is a side cross-section view of the card-edge connector assembly of FIG. 1, taken along the view lines 11—11 of FIG. 9;

FIG. 13a is a front elevation view of a representative front panel of the equipment of FIG. 13.

DETAILED DESCRIPTION OF THE PREFERRED EMBODIMENT

Figure 4:
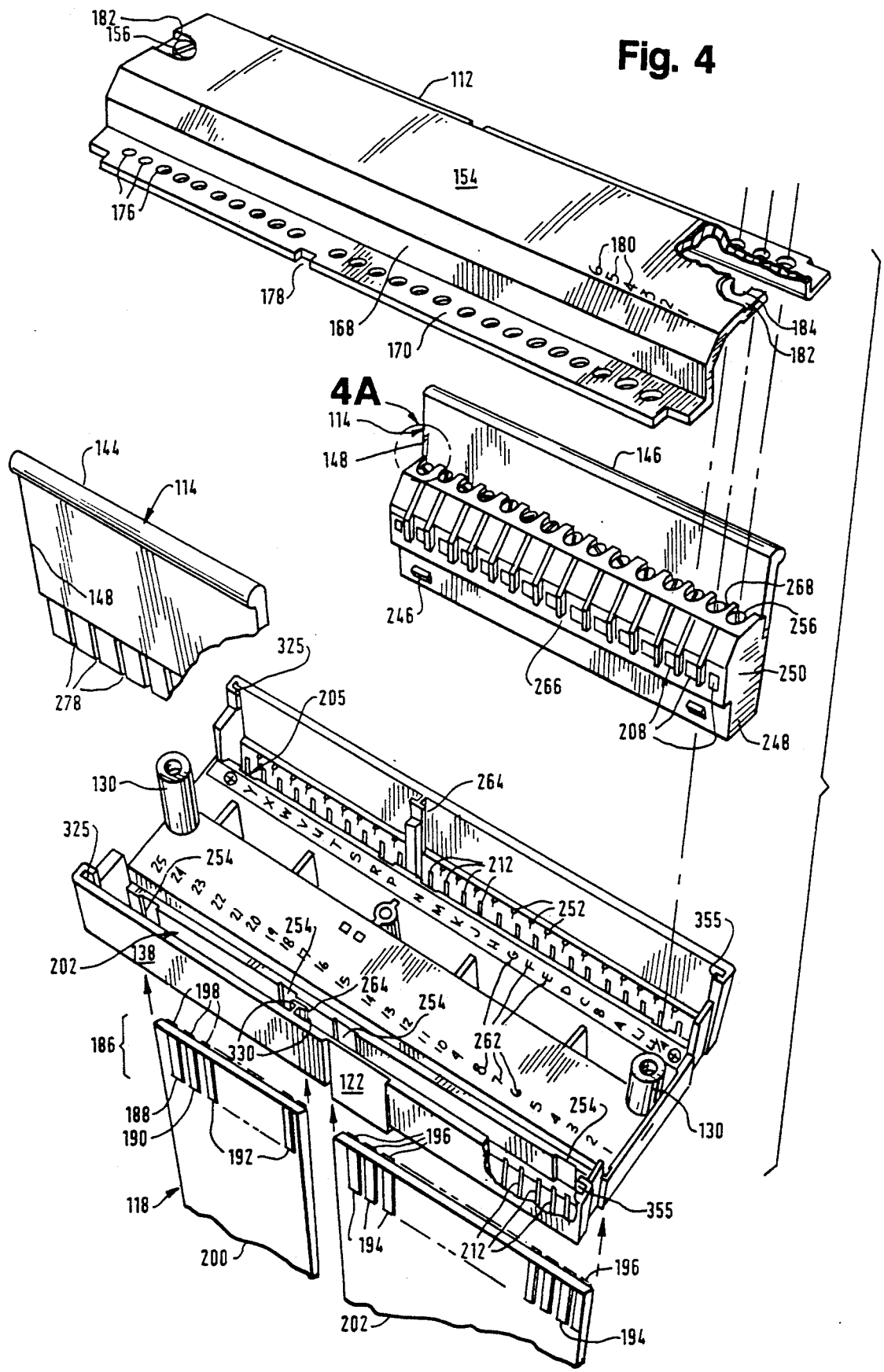
FIG. 4 is an exploded top perspective view of the card-edge connector assembly of FIG. 1.

A card-edge connector assembly 100 constructed according to the present invention is shown generally in FIGS. 1-13a FIG. 1 shows an overview of the connector 100 as it might appear in a typical application environment. FIG. 4 shows an exploded top perspective view of the connector 100. In overview, the connector 100 comprises a generally rectangular housing 110, one or more removable wire termination blocks 114, a cover 112 for retaining the wire termination blocks 114 and for protecting the interior of the connector, and an internal contact retaining cover 206.

A slit-like aperture 204 (FIG. 5) is provided in the housing to receive one or more circuit cards 118, to which wire connections are desired. The circuit cards 118 are inserted into the connector 100 from the bottom. The cards 118 preferably have a plurality of contact pads 188, 190, 192, 194, 196, 198 located on one or both of the exterior surfaces of the circuit cards in an upper peripheral edge region 186 thereof. A plurality of contacts 210 (FIGS. 8-11) are disposed on the interior of the circuit card receiving aperture 204 in a pattern corresponding to that of the contact pads 188, 190, 192, 194, 196, 198 of the circuit cards 118. When the circuit card 118 is inserted into the receiving aperture 204, each of the contact pads 188, 190, 192, 194, 196, 198 engages a corresponding contact 210 (FIG. 8), thereby forming an electrical connection therebetween.

The removable wire termination blocks 114 provide an easily removable means for electrically connecting the desired wiring to the inventive connector 100. A plurality of individual wires 128 (FIGS. 1, 3, 5) are removably attached to wire retaining terminals 208 (FIG. 4) on the wire termination blocks 114. Although for clarity only a few wires 128 are shown in the Figures, in a typical application, there may be 40-100 wires attached to the connector 100, and the space between the housing 110 and the wire cover 112 is almost completely filled. Each of the wire retaining terminals 208 is electrically connected to a respective female contact 214 (FIG. 8) disposed in the base of the wire termination block 114. The female contacts 214 are located in open chambers 215 having apertures 216 (FIGS. 5 and 8) which extend upwardly from the base of the termination block 114 into the chambers. Preferably there is a separate chamber 215 for each female contact 214.

One or more downwardly extending slots 205 (FIG. 4) are provided on the interior of the housing for receiving the wire termination blocks 114. Electrically connected to each of the contacts 210 is a corresponding male header pin 212 (FIGS. 4, 8) which extends upward into the slots 205. The male header pins 212 are preferably arranged in a predetermined pattern in the slots 205 to correspond to the apertures 216 (FIGS. 5, 8) of the wire termination blocks 114. When the termination block 114 is inserted into a receiving slot 205, each of the female contacts 214 engages a corresponding male header pin 212, thereby forming an electrical connection therebetween.

Thus, it can be seen that when the circuit card 118 and the termination blocks 114 are properly inserted in the connector housing, an electrical connection is formed between each of the contact pads 188, 190, etc., and a respective one of the wires 128 installed in termination blocks. For example, circuit card contact pad 188 engages a corresponding contact 210 in the circuit card receiving aperture 204. The contact 210 is, in turn, connected to a corresponding male header pin 212 in the termination block slot 205. The male header pin 212 engages a corresponding female contact 214 of the wire termination block. The female contact 214 is connected to a corresponding wire retaining terminal 208, to which a corresponding one of the wires 128 is connected.

Figure 6:
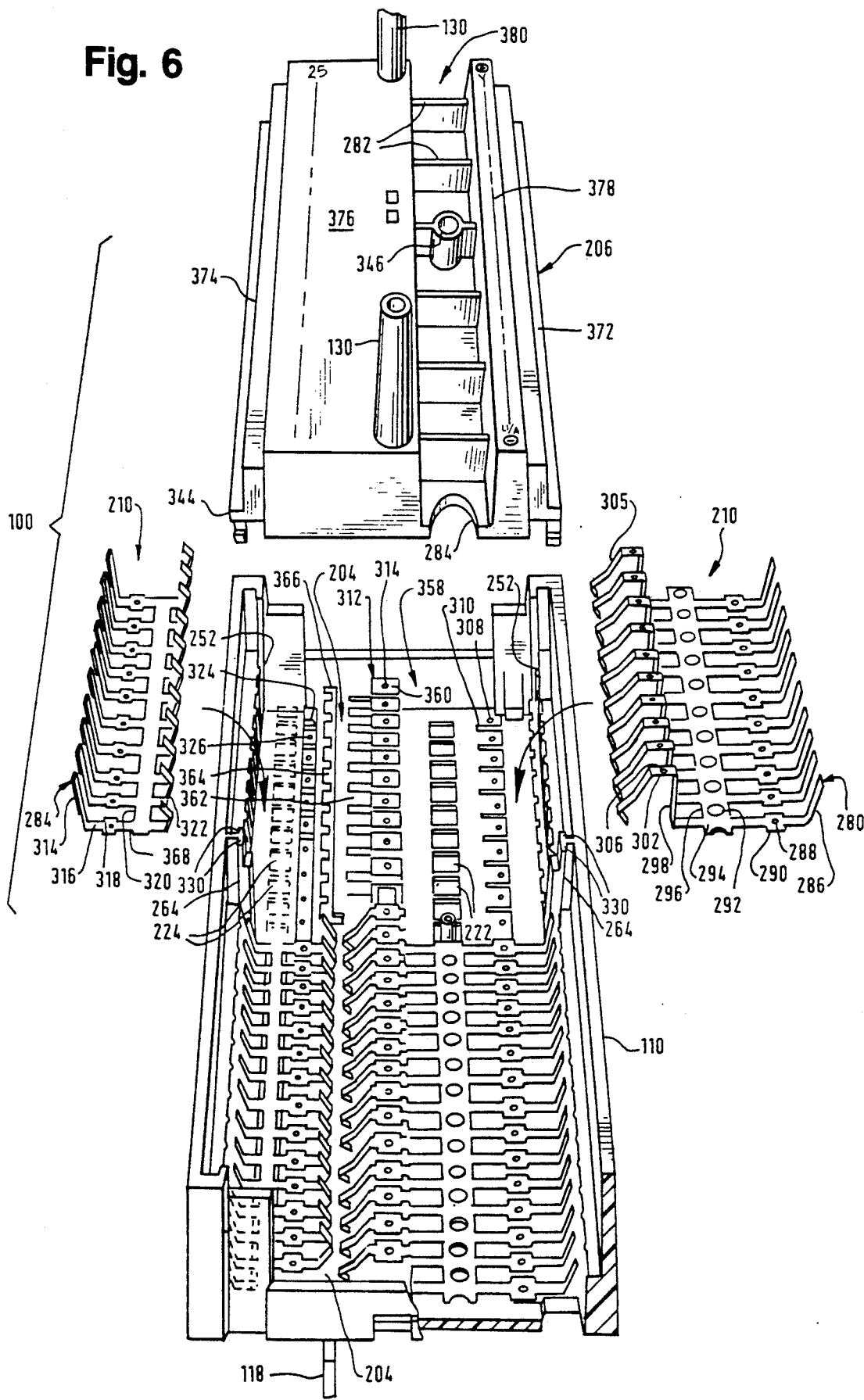
FIG. 6 is an exploded side perspective view of the housing of the card-edge connector assembly of FIG. 1.

In greater detail, the housing 110 is a preferably a generally rectangular structure which forms a modified shell to house and protect a plurality of electrical contacts 210 (FIG. 6). The contacts 210 provide a connection between the contact pads 188, 190, 192, 194, and 196 of the circuit board 118 and the corresponding contacts 214 of the wire termination blocks 114. The housing 110 may be formed from any suitable dielectric plastic material. The housing may be constructed using injection molding or any other appropriate method. In one embodiment of the invention, the housing 110 is formed from an thermoplastic injection molded dielectric.

The housing 110 has a front wall 138 (FIGS. 1-2), a right-hand side wall 132, a left-hand side wall 274 (FIG. 7), a rear wall 272 (FIGS. 7-8), and a bottom wall 220. The side walls 132 and 174 only extend partially to the top of the front and rear walls. These walls form a generally concave cavity 358 which houses contacts 210, a contact retaining cover 206, the wire termination blocks 114, and the cover 112.

Figure 13:
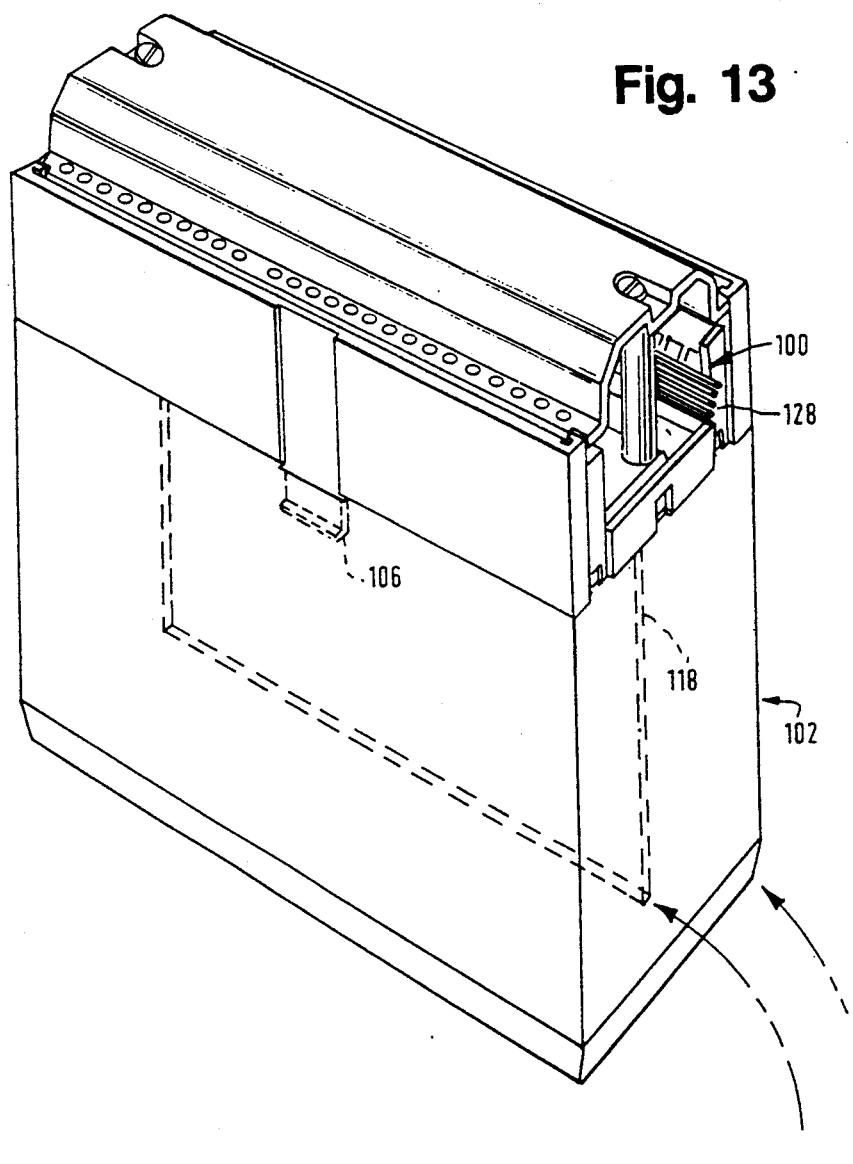
FIGS. 13 and 13A are is a rear perspective view of a piece of electronic equipment showing the inventive connector installed thereon, provided to show a typical environment in which the invention may be appliesd.
Figure 13A:
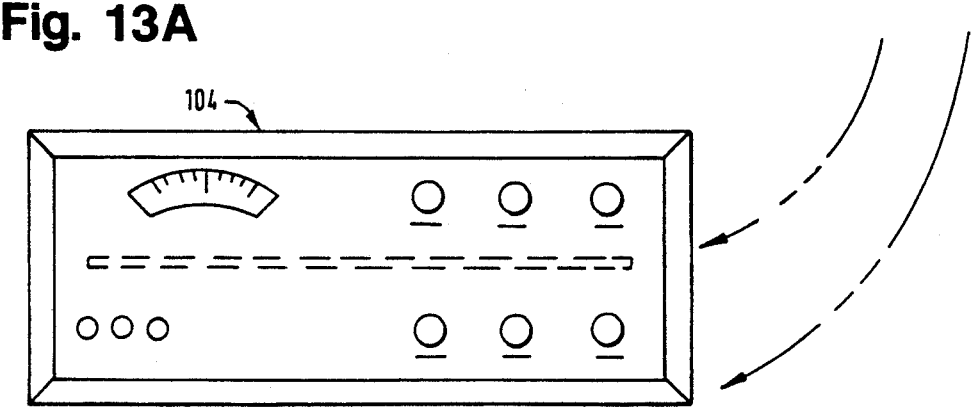

As best seen in FIGS. 13 and 13a, connector may be mounted at the rear a suitable equipment enclosure 102. For example, in a typical application environment, the enclosure 102 may be a hollow tubular structure of rectangular cross section, such as an extruded metal tube or formed sheet metal housing. Although the enclosure is depicted herein as a tubular box, any other suitable support could also be used by slightly modifying the connector 100. For example, the connector could be supported through appropriate mounting posts or standoffs, or could be mounted on a flat plate. In normal use, the equipment may have a front panel 104 (see FIG. 13a) at the opposite end of the enclosure, and the circuit card 118 associated with the front panel 104 would be inserted from that end into the circuit card receiving slot 204 of the connector 100.

Figure 5:
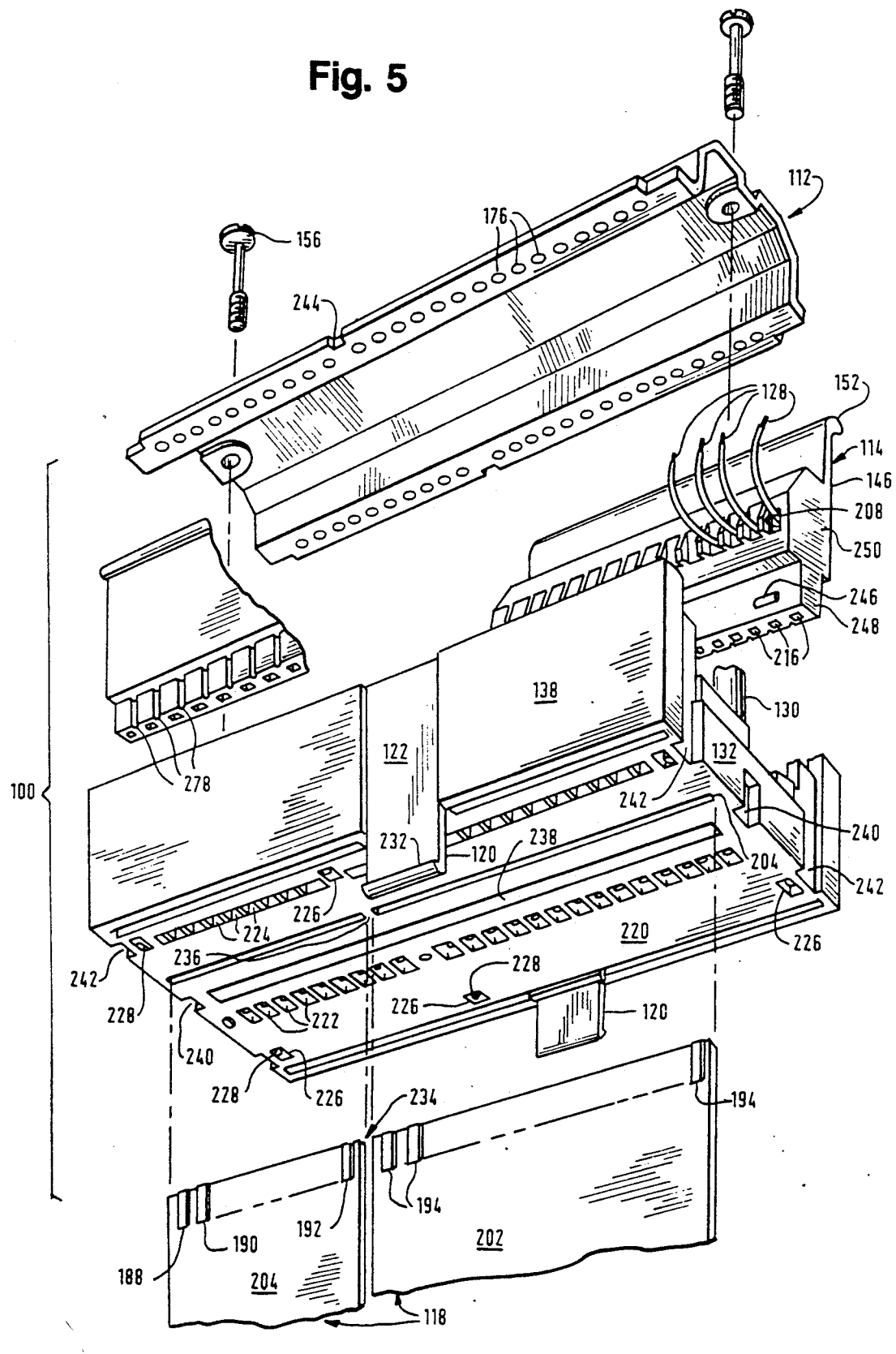
FIG. 5 is an exploded bottom perspective view of the card-edge connector assembly of FIG. 1.

As best seen in FIGS. 4-5 and 13, the housing 110 preferably includes several surface features to facilitate locating and mounting the connector 100 on the enclosure 102. A pair of shallow locator channels or notches 122 are formed in front and rear Walls 138, 272.

A pair of mounting tabs 120 preferably extend downward from the bottom of the locator channels 122 into the interior of the equipment enclosure 102. Apertures 106 are provided in the side wall of the enclosure 102 adjacent the position of the mounting tabs 120. Each mounting tab 120 preferably has a retaining lip 232 (FIGS. 3, 5) which extends outward into the apertures 106 and interferes with therewith to secure the connector 100 in position on the enclosure 102. The connector 100 may be released by urging the mounting tab 120 inward so that the lip 232 clears the aperture 106. Several additional shallow locator notches or channels 240, 242 (FIG. 5) are formed in the side walls 132, 274. Preferably, the mounting tabs 120 are asymmetrically disposed on the housing 110 so that they may cooperate with the apertures 106 to permit installation of the connector on the housing only in a desired orientation.

The bottom surface 220 of the housing 110 preferably has a slitlike aperture 204 for receiving one or more electronic circuit boards 118. Ordinarily, the connector 100 will be used in applications in which a single circuit board 118 is used, and reference numbers 202, 204 refer to left and right portions thereof. However, the connector 100 could accommodate several circuit boards if the application requires. For example, an application might require two circuit cards, and reference numbers 202, 204 would refer to separate left and right circuit cards, respectively.

Preferably, an asymmetrically positioned key block 236 (FIG. 5) is provided in the aperture 204, and a mating key notch 234 is provided in the circuit card 118. When the circuit card 118 is in its normal orientation, the notch 234 coincides with the key 19 block 236, and the circuit card 118 may be inserted into the aperture. However, due to the asymmetric positioning of the key block 236 and notch 234, these structures prevent the circuit card 118 from being installed "upside down" in the aperture 204, because in such an orientation, the notch and the block will not coincide, and the block will interfere with the circuit card. If the connector 100 is to accommodate more than one circuit card, additional blocks (not shown) may be similarly provided in the aperture 204 to separate the circuit cards and to prohibit incorrect card insertion.

Although aperture 204 is shown herein as a slot formed in the housing 110, the circuit card receiving aperture could also be formed in other ways. For example, an appropriate card receiving structure could project from the bottom of the housing using planar structural members to hold the circuit card and to retain the contacts.

The bottom surface 220 of the housing 110 includes locking apertures 226 (FIG. 5) for receiving locking tabs 228 used to retain the contact retaining cover 206 (see FIGS. 6, 8, and 9), which is discussed later in detail. A longitudinal slitlike slot 238 appears in the bottom surface 220 and aids in forming a hollow contact retaining projection 312 (FIG. 6) which extends upward from the floor of interior cavity 358 and which is discussed later in detail. The need for slot 238 depends on the method by which the housing 110 is formed; some construction methods would not require the slot. The bottom surface 220 of the housing 110 also has a plurality of contact separation apertures 222, 224 which will be further explained in detail.

Internal features of the housing 110 are best seen in FIGS. 4, 6, 8, and 9. A set of contacts 210 are preferably provided on each side of the circuit card receiving aperture 204, thereby accommodating circuit cards having contact pads on both sides thereof. If the connector 100 is to be used with circuit cards having only contact pads only on one side, one set of contacts 210 may be omitted, and the internal structure of the housing may then be simplified. The plurality of contacts 210 are preferably longitudinally arranged along the channel in a regular pattern.

A first contact retaining projection 312, which is formed as a longitudinal rib, extends upward from the floor of the interior cavity 312 adjacent and to the rear of the circuit card receiving aperture 204. A second contact retaining projection 366 extends upward from the floor of the interior cavity 312 on the opposite (front) side of the circuit card receiving aperture 204. The projections 312, 366 serve to locate and support contacts 210 in predefined positions with respect to one another (i.e., longitudinally), and with respect to the aperture 204 (i.e., transversely).

For each contact 210 on the rear side of the aperture 204, projection 312 provides a contact-supporting pad 360 on its top surface, and a contact-retaining channel 362 extending transversely from the side wall of the projection 312 adjacent the aperture 204. A contact locator pin 314 extends upward from each pad 360. The contact retaining channels 362 allow one end of contacts 210B to flex transversely, while prohibiting them from deforming in the longitudinal direction. The retaining channels 362 are desireable because the circuit cards may be subject to rotation or longitudinal translation while being inserted. If the channels 362 were not provided, these forces could damage the contacts or deform them into contact with one another. A plurality of substantially parallel contact locator ridges 310 are provided on the floor of the cavity 358. The locator ridges 310 are spaced from each other to form channels therebetween to receive the base of the rear contacts 210. A contact locator pin 308 extends upward from each channel.

For each contact 210 on the front side of the aperture 204, projection 366 provides a contact retaining channel 364 extending transversely from the side wall of the projection 366 opposite the aperture 204. The front contact retaining channels 364 serve the same purpose as rear channels 362. A plurality of substantially parallel contact locator ridges 324 are provided on the floor of the cavity 358. The locator ridges 324 are spaced from each other to form channels therebetween to receive the front contacts 210. A contact locator pin 326 extends upward from each channel.

Figure 6A:
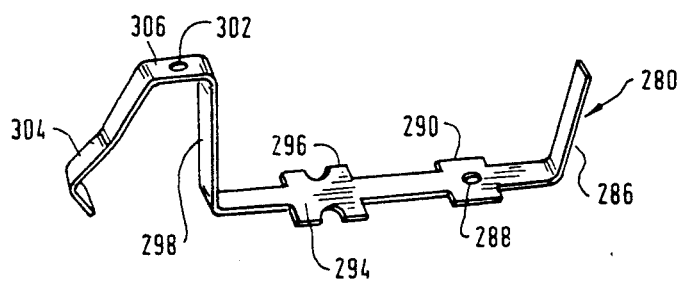
FIG. 6A is side perspective view of a first contact configuration for use in the card-edge connector assembly of FIG. 1.
Figure 8:
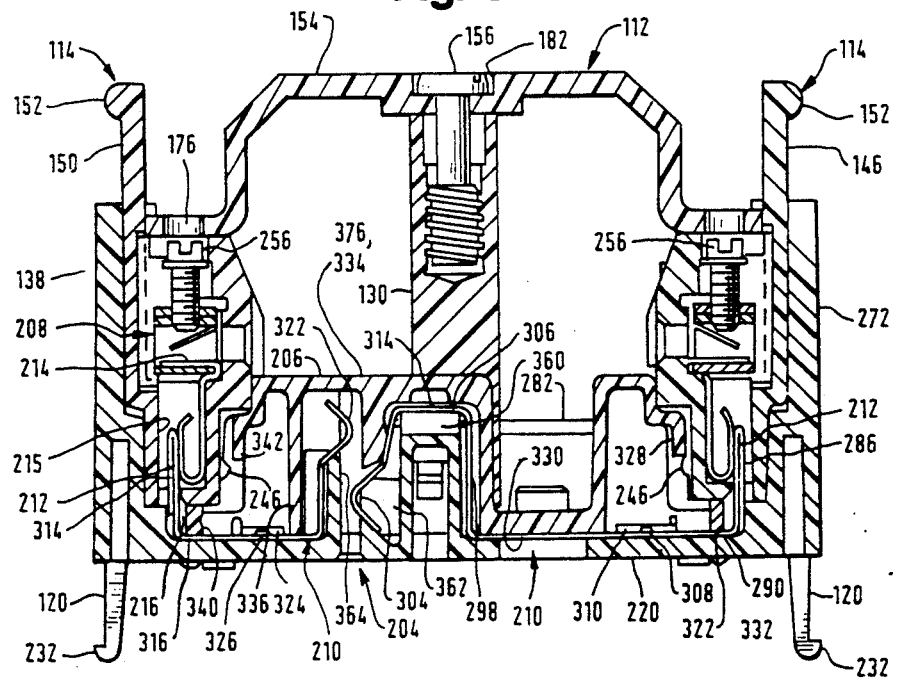
FIG. 8 is a side cross-section view of the card-edge connector assembly, taken along the view lines 8—8 of FIG. 7.

The construction of the contacts 210 is best seen in FIGS. 6, 8, and 9. An exemplary rear contact strip or comb 280 is shown in FIG. 6, and an individual rear contact 280 is shown in FIG. 6A. The rear contact strip 280 has a plurality of spaced substantially parallel first upwardly-extending contact terminals 286, and a plurality of spaced substantially parallel horizontal base legs 294 extending from each contact terminal. A second upwardly-extending intermediate leg 298 extends upwardly from the other end of each base leg 294. The second legs 298 are substantially parallel to the terminals 286 and extend slightly higher than the terminals 286.

A horizontal crown 306 extends from the upper end of each intermediate leg away from the terminals 386 and substantially parallel to the base legs 294. Extending downwardly and outwardly from each horizontal crown 306 is a spring leg 305. The spring leg 305 forms an obtuse angle with the under-surface of the crown 306. Extending downwardly and outwardly from the other end of each spring leg 305 is a triangularly shaped contact 304. The apex of the contacts 304 extend into the card slot 364 (FIG. 8) to provide the contact for the card terminals 196 and 198. The first upwardly-extending terminals 286 each form a male header pin for engaging a corresponding female contact 214 of one of the wire retaining terminal blocks 114. The horizontal portion 294 includes an enlarged locating pad 290 having a small aperture 288 for receiving locating pin 308. The horizontal crown portion 306 similarly has an aperture 302 for receiving locating pin 314.

Figure 6B:
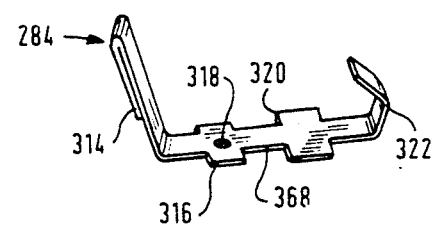
FIG. 6B is side perspective view of a second contact configuration for use in the card-edge connector assembly of FIG. 1.

FIG. 6 also depicts an exemplary front contact strip or comb 284. An individual front contact 284 is shown in FIG. 6B. The front contact 284 strip (same as above) comprises a upwardly-extending portion 314, a horizontal portion 368, and an upwardly and outwardly extending contact portion 322. The upwardly-extending portion 314 forms a male header pin 212 for engaging a corresponding female contact 214 of one of the wire retaining terminal blocks 114. The horizontal portion 368 includes an enlarged locating pad 316 having a small aperture 318 for receiving locating pin 326.

The contact strips 280 and 284 may be constructed of any appropriate mechanically resilient, electrically conductive material using any suitable method. For example, the contacts 280 and 284 may be constructed of copper alloy, brass, or phosphor-bronze sheet material, and may be formed by stamping in a progressive die. As best seen in FIG. 6, it is particularly convenient to form and subsequently handle a plurality of contacts in the connected strips in which the individual contacts are attached to their nearest neighbors by small sprues 296, 368. In such cases, the strip containing a plurality of attached contacts may be installed as a unit in the connector 100.

Once subsequent assembly steps have secured the individual contacts 210 in the desired position, the sprues 296, 368 may be severed by punching or shearing through apertures 322, 224 provided in the floor of the cavity 358 for that purpose. Preferably, the apertures 322, 224 are substantially larger than the sprues to provide room for tooling to enter the aperture and extend above the sprues. This allows the tool to operate on the sprue from both directions so that punching or shearing is more efficient. In addition, the enlarged access openings 322, 224, provide room for portions of the sprues to reside after the sprues have been severed. A sacrificial opening 292 may be provided in the sprue to weaken it to facilitate the severing operation.

Figure 12:
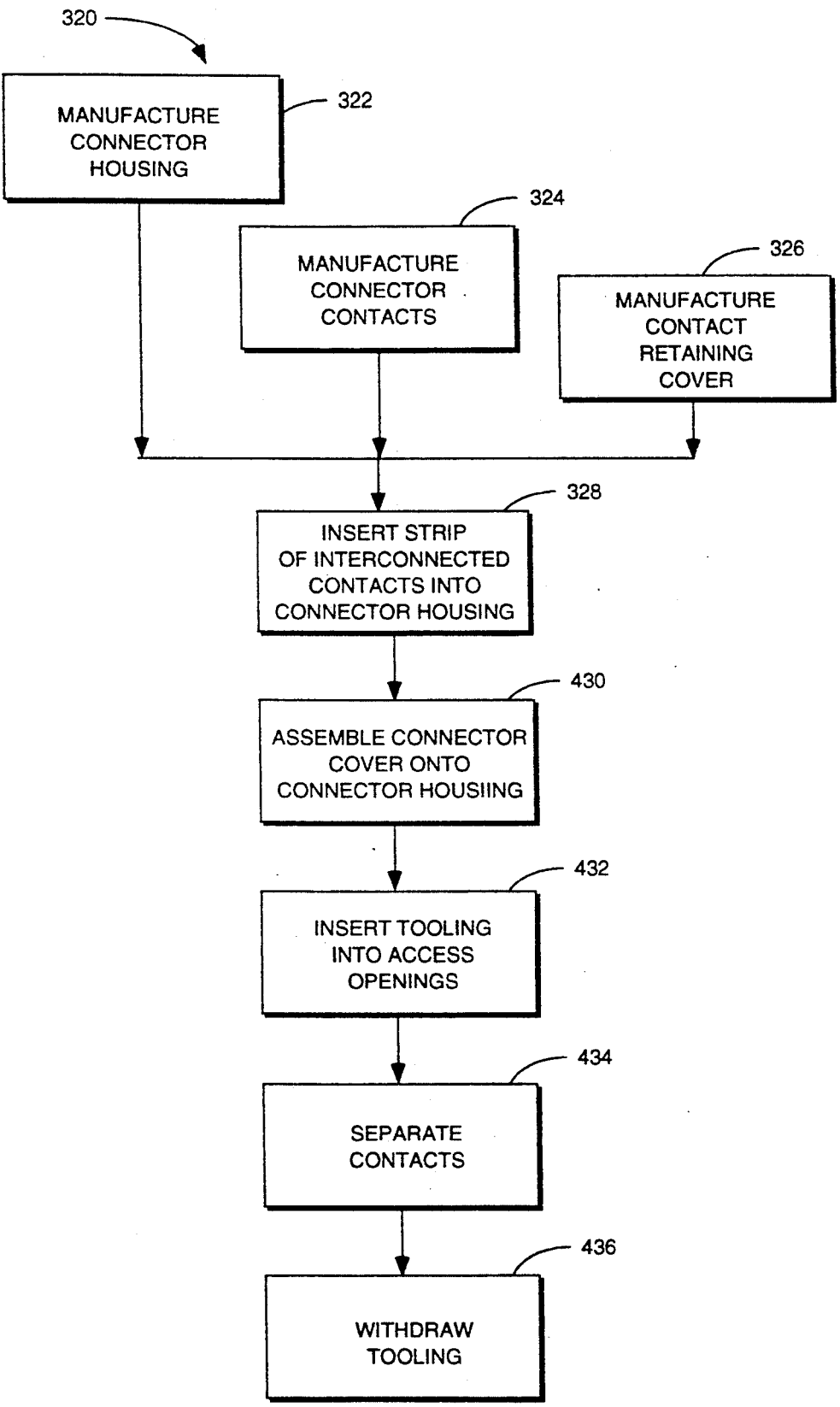
FIG. 12 is a block diagram of a method according to the present invention of constructing a connector of the type generally described herein.

FIG. 12 shows a method 420, according to the present invention, of constructing a connector of the type generally described herein. This method may be useful for constructing any connector having a plurality of contacts which may be formed as an interconnected strip or comb but which may be expensive or difficult to handle or install on an individual basis. It is contemplated that the interconnection sprue is electrically conductive, such that it would be desireable to electrically disconnect most adjacent contacts from one another. Hoever, there will be cases in which a group of terminals may be left connected within the housing. The sprues would serve as internal jumpers between such contacts, so that only a single wire (often a ground) can make many connections on the circuit board. Such groups may also be used to connect two or more external wires together, or two or more points on the circuit board.

In step 422, a connector housing is manufactured. In step 424, a contact retaining cover is manufactured. In step 426, the connector contacts are manufactured. The order of manufacture of these items is unimportant and may occur in parallel or in series. The connector housing and contact retaining cover must be designed such that the contacts are securely retained in predetermined positions when the housing and cover are assembled together. The connector housing or the contact retaining cover must provide access openings for tooling to operate on the sprues attaching one connector to another even after the housing and cover have been assembled together.

In step 428, a still-interconnected strip of contacts are inserted into their proper position in the connector. In step 430, the contact retaining cover is assembled onto the connector housing. As a result of this assembly, the contacts are now securely retained. In step 432, tooling is inserted into the access openings. In step 434, the sprues interconnecting the contacts are punched, sheared, cut, or otherwise separated by the tooling. Preferably, only a single tooling operation is required to separate all of the sprues. As a result, the sprues no longer provide electrical connection between adjacent contacts. In step 436, the tooling is withdrawn. This method of handling a plurality of contacts as a unit through the connector assembly process, and separating the contacts only after they have been securely retained in position in the connector provides substantial advantages in cost, time, and manufacturing complexity.

The front and rear contacts 284, 280 each have triangular contact portions 322, 304, respectively, which have their apexes extending angularly into the circuit card receiving aperture 204 to engage the contact pads 188, 190, 192, 194, 196, 198 on the circuit card. The contact portions 322, 304 are preferably angularly shaped and are resilient so that they may be displaced by the circuit card 118 as it is inserted into the card receiving aperture 204. Once the circuit card 118 has been inserted into aperture 204, the contact portions 322, 304 remain resiliently urged into secure mechanical and electrical contact with the contact pads of the circuit card. As best seen in FIGS. 8-9, contact portions 322, 304 are preferably offset by a substantial vertical distance 370 to prevent undesired contact between them.

The internal contact retaining cover 206 is best seen in FIGS. 6, 8, and 9. The contact cover 206 is installed over the contacts 210 or contact strips 280 and 284 and cooperates with locator pins 308, 314, and 326, and locator riges 310, 324 to secure the contacts in desired positions within the housing 110. The contact cover 206 also forms the inner walls of the slots 202 for receiving the wire retaining terminal blocks 114. As best seen in FIG. 6, the contact cover 206 is generally rectangular and comprises front and rear raised sections 376, 378, a longitudinal trough section 380 intermediate the raised sections, and two cylindrical wire cover supports 130 which extend upward from the front raised section 376. The trough section 380 is preferably bridged by a plurality of buttresses 282 to provide structural rigidity. A stepped front wall portion 372 forms the inside wall of the front terminal block receiving slot 202. A stepped rear wall portion 374 forms the inner wall of the rear terminal block receiving slot 202. Although the foregoing explanation describes the terminal block receiving slot 202 as formed by the cooperation of the side wall of the housing and the contact cover 206, the terminal block receiving slot 202 could also be formed conventionally as a slot in the housing 110 or in the contact cover 206.

As best seen in FIG. 8, the bottom surface 330 of the trough section 380 and the rear edge 332 of the contact cover rear wall portion 374 each bear against the horizontal portions 294 of the rear contacts 210. This urges the rear contacts downward so that they are captured and retained by locating ridges 310 and locating pins 308 and 314. Because the rear contacts are sandwiched between the contact cover 206 and the floor of the cavity 358, they are fixed vertically. Because the contacts are captured by the locating ridges 310 and locating pins 308, 314, the contacts are fixed generally from any movement. Thus, the contact cover 206 secures the rear contacts in desired predetermined positions.

As best seen in FIG. 8, the contact cover 206 includes a contact retaining member 336 which extends downward from the front raised section 376 thereof. The contact retaining member 336 and the front edge 340 of the contact cover front wall portion 374 each bear against the horizontal portions 368 of the front contacts 210. This urges the front contacts downward so that they are captured and retained by locating ridges 324 and locating pins 326. Because the front contacts are sandwiched between the contact cover 206 and the floor of the cavity 358, they are fixed vertically. See FIG. 11. Because the contacts are captured by the locating ridges 324 and locating pins 326, the contacts are fixed generally from any movement. Thus, the contact cover 206 secures the front contacts in desired predetermined positions.

Figure 7:
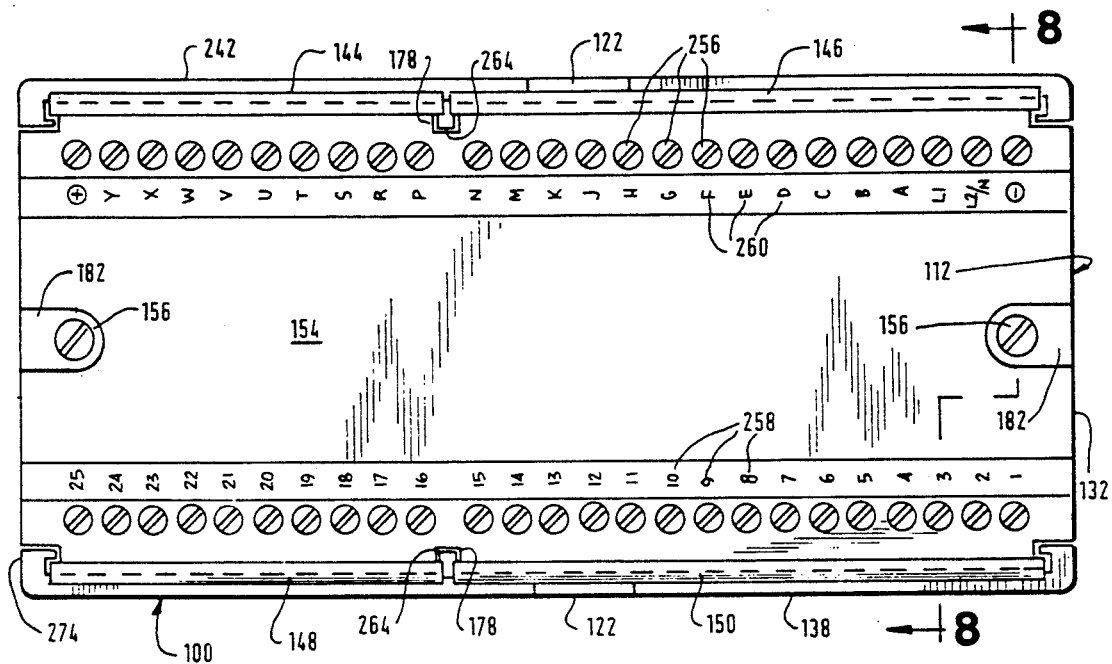
FIG. 7 is a top plan view of the card-edge connector assembly of FIG. 1.

The inventive connector 100 preferably includes one or more wire retaining termination blocks 114. For example, as seen in FIG. 7, a preferred embodiment of the connector 100 includes four wire retaining termination blocks 144, 146, 148, 150, which differ only in size and in their orientation when installed in the connector 100. As shown in FIGS. 4, 5, 8, and 9, each of the termination blocks 114 has a body portion 250, an interface portion 248, and a handle portion 252. The body portion contains a plurality of terminals 208 for receiving and securing a wire 128 to produce a high-quality electrical connection between the terminal 208 and the wire 128.

The interface portion 248 is constructed to mate with the termination block receiving slots 202 provided in housing 110. The interface portion 248 has a plurality of female contacts 214, each electrically connected to a corresponding one of the wire terminals 208. The female contacts 214 are disposed in apertures 216 which are arranged in a pattern to coincide with the male header pins 212 of the termination block receiving slots 202. When the wire termination block 114 is inserted into an appropriate termination block receiving slot 202, a connection is made from each of the wire terminals 208 to a corresponding one of the male header pins 212.

FIGS. 9-10 show a detailed view of an exemplary wire receiving terminal 208 and its corresponding female contact 214. The wire receiving terminal 208 is housed in a cavity 384 extending downward from a top surface 386 of the body portion of the termination block 114. An aperture 382 for receiving a wire 128 is provided and communicates with the cavity 384. A wire receiving socket 352 is provided in the cavity 384 and is formed as a rectangular "O"-shaped sleeve. A resilient contact member 350 extends angularly into the socket 352.

An adjustable clamping means 256, which may be a suitable threaded screw or bolt, extends through a mating aperture into the socket 352 to bear on contact member 350. The contact member 350 prevents damage to the wire due to sharp edges on the clamping means 256, which might otherwise occur if the clamping means bore directly on the wire. Other suitable clamping means could also be used. Access to the clamping means 256 is provided through the top of the cavity 384. A portion of the female contact 214 extends horizontally into the socket 352 to rest on the base thereof. The remainder 354 of the female contact 214 descends into a channel 216 where a portion 356 of the contact is folded back on itself to form a resilient surface for engaging a corresponding male header pin 212.

To install a wire 128 in the terminal 208, the wire is inserted through the aperture 382 and into the socket 352. The clamping means 256 is adjusted to bear on the resilient contact member 350, thereby compressing the contact member 350 against the wire 128, and urging the wire into secure mechanical and electrical contact with the portion of female contact 214 resting in the base of the socket 352.

The female contact 214, wire receiving socket 352, and resilient contact member 350 may be constructed of any appropriate mechanically strong, resilient material using any suitable method. For example, these items may be constructed of copper, brass, phosphor-bronze, or stainless steel sheet material, and may be formed by stamping or other appropriate techniques.

In order to ensure that the wire retaining terminal blocks 114 are inserted in the proper orientation, a plurality of guide channels 278 (FIGS. 4-5) are formed on the outer face of the interface portion 248 of the block. A plurality of vertical ribs 252 (FIGS. 4, 7) are provided on the front and rear walls of the housing cavity 158 at the terminal block receiving slots 202. The ribs 252 preferably extend a short distance inward from the walls and are constructed to engage the channels 278 (FIGS. 4, 5) in the terminal blocks 114. If a user attempts to insert the terminal block 114 in an improper orientation, the ribs 252 will not coincide with the channels 278 and the resulting interference will preclude insertion. Also, a plurality of guide channels 325, 330 and 335 are provided by the housing walls 272, 274 and the divider 264 to cooperate with the slide guides 340 (FIGS. 4 and 4A) formed on both end walls 250.

One or more vertically-extending divider ribs 264 (FIG. 7) may be provided on the interior walls of the housing 110 to limit the size of the terminal blocks 114 which may be inserted into receiving slots 202. The divider ribs 264 are preferably disposed asymmetrically so that different sized terminal blocks 114 are required on each side of the divider ribs 264. This practice helps prevent installation errors, because if an attempt is made to install a terminal block in the wrong position, it will be apparent that the available space is either too large or too small to accommodate the block. The divider ribs have channels 330 formed therein to cooperate with the slide guides 340 as stated above.

One or more raised detent ribs 248 are preferably formed on the opposite surface of the interface portion 248 of the terminal block. The detent ribs 248 interfere with mating depressions (not shown) on the contact cover 206 to removably secure the terminal blocks in the installed position.

A wire cover 112 is provided to retain the wire receiving terminal blocks 114 in their proper position once they are installed in the connector 100. In addition, the wire cover 112 acts as a strain relief, and secures the large mass of wires which extend from the terminal blocks 114 out of the connector. As best seen in FIG. 3, the wire cover 112 has a substantially planar upper surface 154, a pair of downward-extending leg portions 158, 168 attached to the upper surface, and a pair of horizontal wing portions 160, 170 attached to the leg portions.

The wire cover 112 is attached to the connector 100 by means of a pair cylindrical wire cover supports 130 which extend upward from the internal contact retaining cover 206. For each support 130, a relieved land area 182 is provided in the upper surface 154 to accommodate a fastener 156. Fastener 156 may be any suitable fastening means, such as a threaded bolt or screw, for which mating treads are provided in the supports 130.

When the wire cover 112 is installed, the horizontal wing portions 160, 170 bear against the top surface 386 of the terminal blocks 114, securing the terminal blocks in position. A plurality of apertures 176 are preferably provided in the wing portions 160, 170 to coincide with the positions of the adjustable clamping means 256 of the wire receiving terminal blocks 114. These apertures 176 provide access to tighten the clamping means 256 without removing the wire cover 112. Appropriate indicia 258, 260 may be inscribed on the wire cover to identify the wire, circuit, or contact associated with each terminal. Key notches 178 are provided in the wire cover 112 to receive vertically-extending divider ribs 264 (FIG. 7). Because the divider ribs 264 are positioned asymmetrically, the ribs allow the wire cover to be installed in only one orientation.

In use, the removable wire termination blocks 114 are preferably removed from the inventive connector 100 prior to installation of the wiring. Alternatively, the termination blocks 114 may be supplied separately from the connector 100. The wiring is then installed on the termination blocks 114, and the termination blocks 114 are subsequently installed on the connector 100. The wire cover 112 is then installed over the termination blocks 114 to retain them in position, and to hold attached wiring in a desired configuration.

Thus, an improved electronic circuit card edge connector is provided which avoids the disadvantages of prior art connectors. The inventive connector requires no auxiliary circuit board for connections to external wiring. Because the wire termination blocks 114 are easily removable from the connector 100, connectors which become defective may be easily and quickly replaced, and the wiring may be nearly instantly disconnected from the connector for testing or maintenance of either the wiring, the connector, or the attached circuit board.

In addition, the housing and the wire cover cooperate to secure and provide a strain relief for the large bundle or mass of wires attached to the connector. Tis protects the fragile electrical contacts from damage due to stress from the wires or due to any externally applied forces.

As a result of this construction, the wiring may be advantageously installed on the termination blocks at any time, for example, even before the equipment is itself delivered or installed. Further, installing the wiring onto the termination blocks need not be performed at the place where the equipment is installed. For example, cables including the wire termination blocks may be economically prepared in advance of equipment installation at a manufacturing facility using high-speed production equipment when appropriate. Even where the wiring is installed on the termination blocks at the equipment location, an advantage is achieved because the installation need not occur in the cramped environment inside the equipment. As a result, even in high-density wiring environments, the craftsperson can conveniently install wiring on the inventive terminal blocks without interference from previously installed wiring. In addition, this reduces the time required for even manual wire installation, and allows a large number of craftspeople to be simultaneously applied to the installation task without interfering with one another. An added advantage is that one or more terminal blocks may be safely removed, while equipment is operating, without disturbing adjacent terminal blocks or disrupting any other circuits or disturbing power to the equipment.

What is claimed is:

1. An electronic circuit edge connector comprising
a housing,
a plurality of electrical contacts mounted in said housing,
each of said electrical contacts having a first contact end and a second contact end,
a circuit edge card slot formed in said housing,
said slot being sized to receive a portion of said edge card which has a plurality of contact pads arranged in a first pattern,
said first contact ends being arranged adjacent said edge card slot and arranged in a second pattern so as to make electrical contact with said edge card contact pads when said edge card contact pad portion is inserted in said slot,
said second contact end being remote from said first contact end,
a terminal block removably mounted on said housing,
said terminal block having a plurality of terminal contacts mounted therein,
each terminal contact having a first terminal contact end and a second terminal contact end,
said terminal block having wire mounting means to mount a wire to each second terminal contact end, said terminal block having contact connector means to electrically connect each first terminal contact end to a corresponding second contact end.

2. The connector of claim 1 wherein said terminal block has a body portion, a handle portion attached to the body portion, an interface portion attached to said body portion for engagement with terminal block receiving slot in said housing, a plurality of first and second terminal cavities in said body portion, and a plurality of wire connection terminals disposed primarily in said first terminal cavities;

said second terminal cavities being in a bottom surface of said interface portion for receiving said second contact end.

each of said wire connection terminals having a substantially rectangular tubular socket for receiving an external wire, a resilient contact member electrically connected to and extending into said socket, an adjustable clamping screw extending into said socket and an extension portion electrically connected to said socket and extending into said third opening of said terminal cavity;

said adjustable clamping screw bearing downward upon said resilient contact member to capture said wire between said contact member and an inner surface of said socket, thereby forming a secure electrical and mechanical connection between said wire and said terminal.

3. The connector of claim 1 wherein said plurality of contacts mounted in said housing are a plurality of first housing contacts and a plurality of second housing contacts, each of said first housing contacts having a first and second contact end, said second housing contacts each having a third and fourth contact end, said second and third contact ends extending vertically upwardly from an inner bottom surface of said housing and adjacent side walls of said housing, said first and third contact ends being shaped to provide an apex extending into the plane of said edge card slot, said apex ends having a spring leg to urge said apexes into said slot plane and to allow said apex to contact separate edge card contact pads, said first and third apexes being spaced from each other in said slot.

4. The connector of claim 3 wherein said first housing contacts are substantially u-shaped with said first apex end being an angular-shape with the apex extending away from the second contact end, said second housing contact has a center base a fifth leg extending vertically upwardly from said base substantially parallel to said fourth contact end, a horizontal portion extending from a top of said fifth leg away from said fourth contact end, a sixth leg extending downwardly from said horizontal portion and, the third angular-shape apex extending from said sixth leg.

5. The connector of claim 4 wherein said first housing contact has at least one means to orient, said first housing contact in said housing and said second housing contact has at least two means to orient said housing contact in said housing.

6. The connector of claim 1 wherein said terminal block has a body portion, a handle portion attached to the body portion, an interface portion attached to said body portion for engagement with terminal block receiving slot in said housing, a plurality of first and second terminal cavities in said body portion, and a plurality of wire connection terminals disposed primarily in said first terminal cavities;

said second terminal cavities being in a bottom surface of said interface portion for receiving said second contact end.

7. The connector of claim 6 wherein said second contact end is a header pin extending into a respective one of said second terminal cavities when said terminal block is installed, said housing defining a terminal block receiving means, said terminal block receiving means having at least one guide rib formed on said housing wall and extending vertically thereon for preventing improper insertion of said terminal block;

each of said guide ribs having a flange portion, said flange portion and said guide rib cooperating to form a guide channel for engaging and retaining a portion of said terminal block;

at least one of said guide ribs being offset with respect to the longitudinal center of said housing to divide said terminal block receiving means into portions of unequal size;

said terminal block receiving means having a plurality of additional smaller vertical guide ribs formed on said housing wall; and said terminal block having a plurality of vertical guide channels formed on said interface portion for mating with said additional guide ribs of said terminal block receiving slot.

8. The connector of claim 7 wherein said housing has a bottom wall and front, rear, right-side, and left-side walls extending upward from the bottom wall;

said bottom wall and said upward walls cooperating to define an internal housing cavity;

said housing having a longitudinal axis parallel to said front and rear walls;

said circuit card receiving slot being disposed in said bottom wall and aligned parallel to said longitudinal axis;

said circuit card receiving slot extending through said bottom wall to communicate with said cavity;

said housing having a plurality of contact locator ridges formed in said bottom wall facing said cavity, each of said locator ridges extending upward and perpendicular to said longitudinal axis, each of said contacts being disposed adjacent at least one of said locator ridges, said locator ridges fixing the positions of said contacts;

said housing having a plurality of contact locator pins formed in said bottom wall facing said cavity, each of said locator pins extending upward, each of said contacts having at least one aperture for receiving a locator pin, said locator pins flying the positions of said contacts in such housing.

9. An electronic circuit edge card connector contact comprising:

first and second upright substantially parallel and spaced legs, a third leg connecting one end of said first and second legs, an angular terminal member extending from the other end of said second leg, a locator operative in said third leg for positioning said contact in a connector.

10. An electronic circuit edge card connector contact comprising:
   first and second upright substantially parallel and spaced legs,
   a third leg connecting one end of said first and second legs,
   a fourth leg extending from the other end of said second leg and parallel to said third leg,
   a fifth leg extending at an obtuse angle from said fourth leg,
   an angular terminal member extending from said fifth leg, and
   locator apertures in said third and fourth legs for positioning said contact in a connector.

11. A device for removably connecting electrical wiring to a circuit card comprising:
   a housing;
   means in said housing for receiving a portion of said circuit card, said portion having at least one electrical contact;
   removable terminal block means for mechanically securing a wire, said removable terminal block means having a contact electrically connected to said wire when said wire is secured;
   means in said housing for receiving said removable terminal block means; and
   means in said housing for establishing an electrical connection from said contact of said circuit card to said contact of said removable terminal means.

12. The device of claim 11 further comprising cover means for retaining said removable terminal block means.

13. The device of claim 11 wherein:
   said housing is generally rectangular;
   said housing further comprises:
   a bottom wall, and
   a front wall, a rear wall, a right-hand-side wall, and a left-hand-side wall, each attached to said bottom wall and extending upward therefrom;
   said front and rear walls being parallel to a longitudinal axis of said housing;
   said walls cooperating to form a housing cavity.

14. The device of claim 13 wherein said means for receiving a portion of said circuit card comprises a slot formed in said bottom wall, said slot being parallel to said longitudinal axis.

15. The device of claim 14 wherein:
   said circuit card has a peripheral edge having an external surface;
   said circuit card includes a plurality of electrical contact pads disposed on said external surface;
   said contact pads are arranged in a predetermined pattern; and
   said means for receiving a portion of said circuit card further comprises a plurality of circuit card connection contacts arranged adjacent said slot in a pattern corresponding to said contact pads of said circuit card for mechanically and electrically engaging said pads when said circuit card is inserted.

16. The device of claim 13 wherein said housing further comprises a contact cover means disposed in said cavity.

17. The device of claim 16 wherein said means for receiving said removable terminal block means comprises a slot formed by said contact cover means and one of said walls of said housing.

18. The device of claim 17 wherein each of said circuit card connection contacts comprises a header pin portion extending upward into said slot, said header pins being arranged in a predetermined pattern.

19. The device of claim 18 wherein said removable terminal block means further comprises a plurality of chambers in said body portion for housing said contacts, each chamber having a first opening for receiving said wire; a second opening for receiving an adjustment tool, and a third opening for receiving a said header pin.

20. The device of claim 11 wherein said removable terminal block means further comprises a body portion, a handle portion atttached to the body portion, and an interface portion attached to the body portion.

21. The device of claim 20 wherein said removable terminal means further comprises a plurality of chambers in said body portion for housing said contacts, each chamber having a first opening for receiving said wire; a second opening for receiving an adjustment tool, and a third opening for receiving a portion of said circuit card contact.

22. A connector for use with a circuit card having a plurality of contact pads arranged near a peripheral edge of the card, said connector comprising:
   a slot for receiving the circuit card peripheral edge;
   said circuit card receiving slot having a plurality of card contacts arranged to correspond in position to said circuit card contact pads when said card is present;
   at least one removable wire attachment terminal block;
   said wiring terminal block having:
   a plurality of first terminals, each of said first terminals being adapted for receiving, mechanically retaining, and electrically contacting a wire,
   and a plurality of second terminals, each of said second terminals being electrically connected to said first terminal;
   a slot for receiving said terminal block;
   said terminal block receiving slot having a plurality of terminal block contacts arranged to correspond in position to said second terminals of said terminal block when said card is present; and
   means for establishing an electrical connection between said card contacts and said terminal block contacts.

23. An electronic circuit card edge connector comprising:
   a substantially rectangular housing;
   a slot in said housing for receiving a portion of an electronic circuit card;
   at least one terminal block removably electrically connected to said connector and adapted for respectively retaining and making an electrical connection to each of a plurality of external wires;
   and a removable wire cover associated with said housing for retaining said terminal blocks and waid wires in a predetermined position with respect to the housing;
   said housing having a bottom wall and front, rear, right-side, and left-side walls extending upward from the bottom wall;
   said bottom wall and said upward walls cooperating to define an internal housing cavity;
   said housing having a longitudinal axis parallel to said front and rear walls;
   said circuit card receiving slot being disposed in said bottom wall and aligned parallel to said longitudinal axis;

said circuit card receiving slot extending through said bottom wall to communicate with said cavity;

said circuit card portion having a plurality of contact pads arranged in a predetermined pattern on at least one external surface thereof;

said housing having a plurality of circuit card connection contacts arranged adjacent said slot in a pattern corresponding to said contact pads of said circuit card portion for mechanically and electrically engaging said pads when said circuit card portion is inserted;

said housing having a plurality of contact locator ridges formed in said bottom wall facing said cavity, each of said locator ridges extending upward and perpendicular to said longitudinal axis, each of said circuit card connection contacts being disposed adjacent at least one of said locator ridges, said locator ridges fixing the positions of said circuit card connection contacts;

said housing having a plurality of contact locator pins formed in said bottom wall facing said cavity, each of said locator pins extending upward, each of said circuit card connection contacts having at least one aperture for receiving a locator pin, said locator pins fixing the positions of said circuit card connection contacts;

said housing having a contact cover for retaining and protecting said contacts, said cover extending longitudinally in said cavity above said bottom wall and between said right-hand-side wall and said left-hand-side wall;

said contact cover having at least one structural member extending downward to bear upon said circuit card connection contacts, said structural member retaining said contacts in secure mechanical engagement with said locator ridges and said locator pins;

said contact cover extending transversely less than the distance between said front and rear walls of said housing to form at least one slot between said cover and either of said front or rear walls for receiving said terminal blocks;

each of said circuit card connection contacts having an intermediate portion extending transversely to said terminal block receiving slot and a header pin portion extending upward into said slot, said header pin portions of said contacts being disposed in a predetermined longitudinal array pattern;

said terminal block having a substantially rectangular body portion, a substantially planar handle portion attached to the body portion, an interface portion attached to said body portion for engagement in said terminal block receiving slot of said housing, a plurality of terminal cavities in said body portion, and a plurality of wire connection terminals disposed primarily in said terminal cavities;

each of said terminal cavities having first, second, and third external openings, said first opening extending transversely from a side wall of said body portion for receiving a wire; said second opening extending downward from an upper surface of said body portion for receiving a tool for adustment of said wire connection terminals; said third opening extending upward from a bottom surface of said interface portion for receiving said header pin portions of said circuit card connection contacts; said third openings of said terminal cavities being disposed in a longitudinal pattern corresponding to said pattern of said header pin portions of said contacts;

each of said wire connection terminals having a substantially rectangular tubular socket for receiving an external wire, a resilient contact member electrically connected to and extending into said socket, an adjustable clamping screw extending into said socket and an extension portion electrically connected to said socket and extending into said third opening of said terminal cavity;

said adjustable clamping screw bearing downward upon said resilient contact member to capture said wire between said contact member and an inner surface of said socket, thereby forming a secure electrical and mechanical connection between said wire and said terminal;

each of said header pin portions of said circuit card connection contacts extending into a respective one of said third openings of said terminal cavities when said terminal block is installed into said terminal block receiving slot, said extension portion of said terminal being formed in a modified triangular shape having an apex extending towrad said header pin portions of said circuit card connection contacts to provide a resilient contact member for mechanically engaging and electrically contacting said header pin portions;

said terminal block receiving slot having at least one guide rib formed on said housing wall and extending vertically thereon for preventing improper insertion of said terminal block;

each of said guide ribs having a flange portion, said flange portion and said guide rib cooperating to form a guide channel for engaging and retaining a portion of said terminal block;

at least one of said guide ribs being offset with respect to the longitudinal center of said housing to divide said terminal block receiving slots into portions of unequal size;

said terminal block receiving slot having a plurality of additional smaller vertical guide ribs formed on said housing wall; said terminal block having a plurality of vertical guide channels formed on said interface portion for mating with said additional guide ribs of said terminal block receiving slot;

said contact cover having a pair of support members extending upwardly therefrom for receiving and supporting said wire cover in a predetermined position covering said housing cavity; said support having openings for receiving a fastener for retaining said wire cover;

said wire cover having a substantially planar upper surface attachable to said support members, a pair of downward-extending leg portions attached to said upper surface, and a pair of horizontal wing portions attached to the leg portions; said horizontal wing portions adapted to bear bear against a top surface of said terminal blocks to secure said terminal blocks in a desired position in said terminal block receiving slots; and said housing having at least one mounting tab extending downward from said bottom wall for securing said housing to a support, said mounting tab having a lip for engaging a portion of the support to retain the housing in a desired position.

24. A method of constructing a connector having a housing and a plurality of contacts comprising the steps of:

a. manufacturing a connector housing;
b manufacturing a contact retaining cover;
c. manufacturing a plurality of connector contacts as a strip of adjacent contacts mechanically attached to one another by a severable sprue;
d. inserting the interconnected strip of contacts into a desired position in said housing;
e. assembling the contact retaining cover onto the connector housing such that each contact is secured in a desired position; and
f. severing said sprues such that adjacent contacts are no longer electrically connected thereby.

25. A method of constructing a connector having a housing and a plurality of contacts comprising the steps of:

a. manufacturing a connector housing;
b. manufacturing a contact retaining cover;
c. manufacturing a plurality of connector contacts as a strip of adjacent contacts mechanically attached to one another by a severable sprue;
d. inserting the interconnected strip of contacts into a desired position in said housing;
e. assembling the contact retaining cover onto the connector housing such that each contact is secured in a desired
f. inserting one or more tools into access openings;
g. severing said sprues by means of said tools such that adjacent contacts are no longer electrically connected thereby; and
h. withdrawing said tools.

* * * * *